United States Patent [19]

Breed et al.

[11] Patent Number: 5,123,499
[45] Date of Patent: Jun. 23, 1992

[54] VELOCITY CHANGE SENSOR WITH DOUBLE POLE SENSOR

[75] Inventors: Allen K. Breed, Boonton Township, Morris County; Ted Thuen, Morris Plains; Carl T. Grossi, Wharton, all of N.J.

[73] Assignee: Breed Automotive Technology, Inc., Boonton Township, Morris County, N.J.

[21] Appl. No.: 663,409

[22] Filed: Mar. 1, 1991

Related U.S. Application Data

[63] Continuation of Ser. No. 423,871, Oct. 19, 1989, abandoned.

[51] Int. Cl.⁵ .............................................. H01H 35/14
[52] U.S. Cl. ........................... 180/282; 200/61.45 M; 200/61.53
[58] Field of Search ............... 200/61.45 R, 61.45 M, 200/61.53; 180/282; 280/734, 735

[56] References Cited

U.S. PATENT DOCUMENTS

| | | | |
|---|---|---|---|
| 3,778,572 | 12/1973 | Matsui | 200/61.45 M |
| 3,784,773 | 1/1974 | Jubenville | 200/61.45 M |
| 3,840,088 | 10/1974 | Murumo et al. | 200/61.45 M |
| 4,039,790 | 8/1977 | Treckman | 200/61.53 |
| 4,718,775 | 1/1988 | Keznickl | 200/61.53 |
| 4,816,627 | 3/1989 | Janotik | 200/61.45 M |
| 4,857,680 | 8/1989 | Janotik | 200/61.53 |
| 4,900,880 | 2/1990 | Breed | 200/61.45 M |
| 5,005,861 | 4/1991 | Breed et al. | 200/734 |
| 5,010,217 | 4/1991 | Heuniken et al. | 200/61.45 M |

FOREIGN PATENT DOCUMENTS

| | | |
|---|---|---|
| 0125493 | 11/1984 | European Pat. Off. |
| 2617923 | 11/1976 | Fed. Rep. of Germany ... 200/61.45 M |
| 537306 | 5/1922 | France ......................... 200/61.53 |
| 1414555 | 11/1975 | United Kingdom . |
| 1435873 | 5/1976 | United Kingdom . |
| 2051482 | 5/1979 | United Kingdom . |
| 1586611 | 3/1981 | United Kingdom . |

*Primary Examiner*—Charles A. Marmor
*Assistant Examiner*—Karin Tyson
*Attorney, Agent, or Firm*—Kane, Dalsimer, Sullivan, Kurucz, Levy, Eisele and Richard

[57] ABSTRACT

An accelerometer for sensing velocity changes particularly suited for passenger restraint systems in a motor vehicle for the deployment of an air bag includes a housing with contact blades and a magnetically biased contacting element. The contacting element is arranged to move toward the contact blades when a deceleration exceeding a threshold level is sensed. The contact blades are spaced away from each other so that one is bent toward the other by the contacting element to form a direct electrical path, thereby deploying the restraint system.

10 Claims, 2 Drawing Sheets

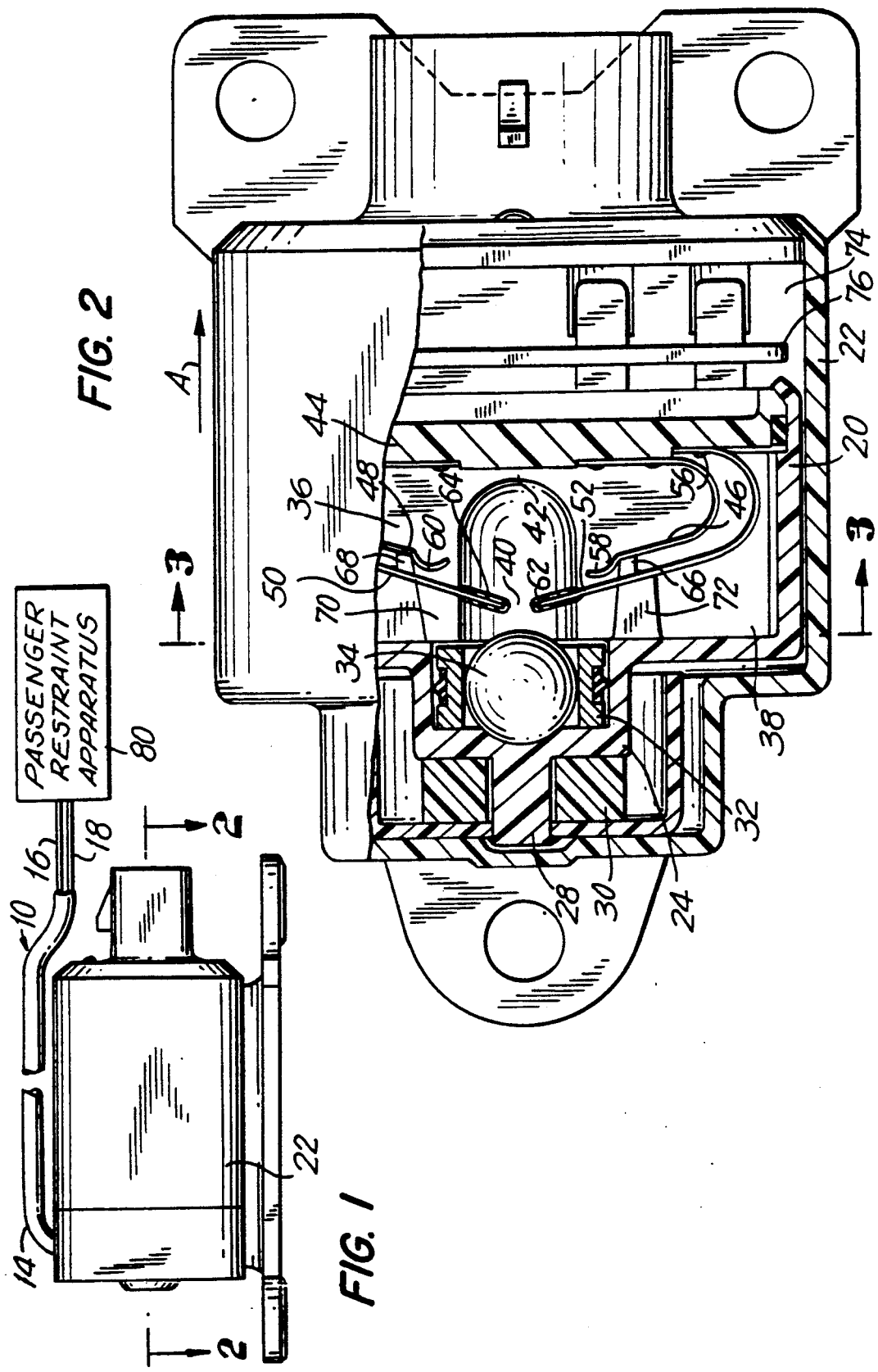

VELOCITY CHANGE SENSOR WITH DOUBLE POLE SENSOR

This is a continuation of co-pending application Ser. No. 07/423,871, filed Oct. 19, 1989, now abandoned.

RELATED APPLICATIONS

This application covers subject matter related to application Ser. No. 417,914 entitled "A Velocity Change Sensor with Contact Retainer", now U.S. Pat. No. 5,011,182.

BACKGROUND OF THE INVENTION

1. Field of the Invention

This invention pertains to a velocity change sensor or accelerometer used in motor vehicles for detecting sudden changes in velocity and for activating in response a passenger restraining device such as an air bag. More particularly, this device includes an element which moves to a preset position in response to a sudden deceleration to activate a pair of contact blades.

2. Background of the Invention

Studies have been made which indicate that injuries in motor vehicle accidents, especially at high speeds, can be substantially reduced or eliminated by the use of passenger restraint systems. (The term "passenger" is used to cover the driver of a car as well.) These systems include an inflatable balloon usually termed an air bag which normally is stored away in the instrument panel or the steering wheel. When the motor vehicle is subjected to a sudden deceleration, the air bag is inflated and is deployed automatically in a position which cushions the passengers, restrains their movement and prevents contact between them and the automobile interior such as the windshield, the steering wheel, the instrument panel and so on. Of course, a crucial element of all such systems is the velocity change sensor or accelerometer which initiates the inflation and deployment of the air bags. The motion of the motor vehicle must be carefully and precisely monitored so that the air bags can be deployed very fast, before the passengers suffer any substantial injury.

A velocity change sensor is disclosed in U.S. Pat. No. 4,329,549 assigned to the same company as the present invention. This sensor comprises a tubular housing surrounding a metallic shell, a metal ball and a magnet biasing the ball toward a first end of the shell. At the second end of the shell there is a pair of electrical contact blades. The sensor is positioned in the motor vehicle in an orientation such that when the motor vehicle experiences a deceleration which exceeds a preset level, the ball moves from the first toward the second end, making contact with the two blades. Because the blades and the ball are made of on electrically conducting material, when the ball contacts the blades, an electrical path is established between the two blades. This electrical path is used to initiate a signal for the deployment of the air bags.

One problem with the device shown in U.S. Pat. No. 4,329,549 is that the electrical contact is made through the ball, and since the contact points are indeterminate the whole surface of the ball must be treated to use a low resistance electrical path. For example, the ball is often coated with a thin layer of gold or similarly, highly conductive material. However, this process is expense and time consuming. Furthermore, the conductive layer may wear off as the ball moves along its path.

OBJECTIVES AND SUMMARY OF THE INVENTION

In view of the above mentioned disadvantages of the prior art, it is an objective of the present invention to provide a restraint system in which in response to a crash, an electrical path is completed which does not pass through the inertial or moving element of the sensor.

A further objective is to provide a restraint system with a velocity sensor in which an inertial moving element causes a contact between two electrical contact blades substantially, simultaneously.

Other objectives and advantages of the invention shall become apparent from the following description. An accelerometer constructed in accordance with the invention includes a housing with at least one pair of contact blades; and an element moving in a predetermined path in response to a change in velocity of the motor vehicle. The two contact blades are disposed in the path of the moving element in such a manner that a direct electrical path is established through the contact by the ball. The contact is arranged so that the electrical path does not pass through the moving element itself, thereby reducing costs.

BRIEF DESCRIPTION OF THE FIGURES

FIG. 1 shows a side elevational view of an accelerometer constructed in accordance with the invention;

FIG. 2 shows a side cross-sectional view of the accelerometer of FIG. 1;

DETAILED DESCRIPTION OF THE INVENTION

Figure 3:
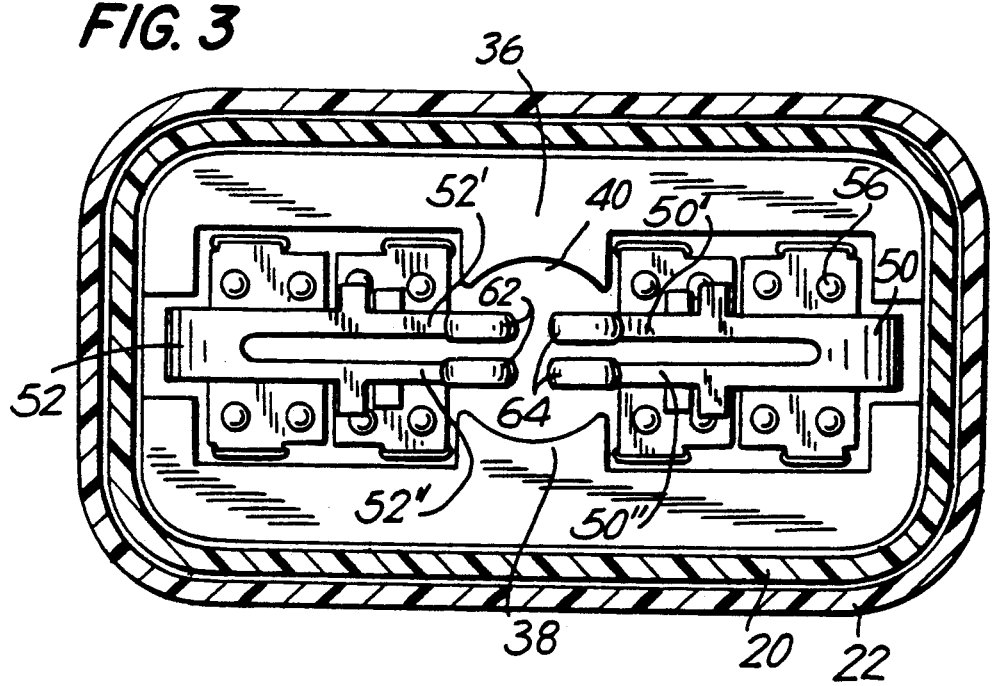
FIG. 3 shows a cross-sectional view of the accelerometer of FIG. 2 taken along line 3—3.

Turning now to the Figures, an accelerometer or velocity change sensor 10 constructed in accordance with this invention is usually mounted on the motor vehicle (not shown). The sensor is connected by a cable 14 by at least two conductors 16, 18 to a control device for the deployment of the air bag.

The sensor 10 has a tubular body 20 disposed in a housing 22 and terminating at one end with a reduced portion 24 terminating in an end wall 26. An extension 28 projects outwardly from end wall 26 as shown, to hold an annular permanent magnet 30. The body 20 is preferably made of a plastic material. The reduced portion 24 holds a metal ball 34 which is slidably disposed within the metallic sleeve 32.

Body 20 is terminated with an axially disposed cap 44. Cap 44 may be attached to body 20 by any well known means such as with an adhesive, or by sonic welding. Mounted on cap 44 there are four blades 46, 48, 50 and 52. For the sake of convenience, blades 46 and 48 shall be referred to as the lower blades while blades 50 and 52 shall be referred to as the upper blades. Each of these blades is secured to cap 44 by a pin 56 or other similar means known in the art, and is made of a relatively thin and flat conductive material such as copper, and formed into the U-shapes shown in FIG. 2. Lower blades 46 and 48 are terminated at their upper portions with respective curved sections 58 and 60 as shown in FIG. 2. Upper blades 50, 52 extend further radially inward into the passageway 40 and their tips are preferably coated with an insulating material as at 62, 64, such as a plastic material. Disposed within body 20, there is a plurality of ribs 66, 68, 70, 72 for biasing the blades to the positions shown in FIG. 2.

Preferably, each of the blades is split into two parallel sections for the sake of redundancy. For example, in FIG. 3 blade 50 is shown with two parallel sections 50' and 50" each terminating with an insulating material 64. Blade 52 is similarly split into parallel sections 52', 52".

A space 74 is provided between the body 20 and housing 22 for holding other electronic parts mounted, for example, on a printed circuit board 76.

Figure 4:
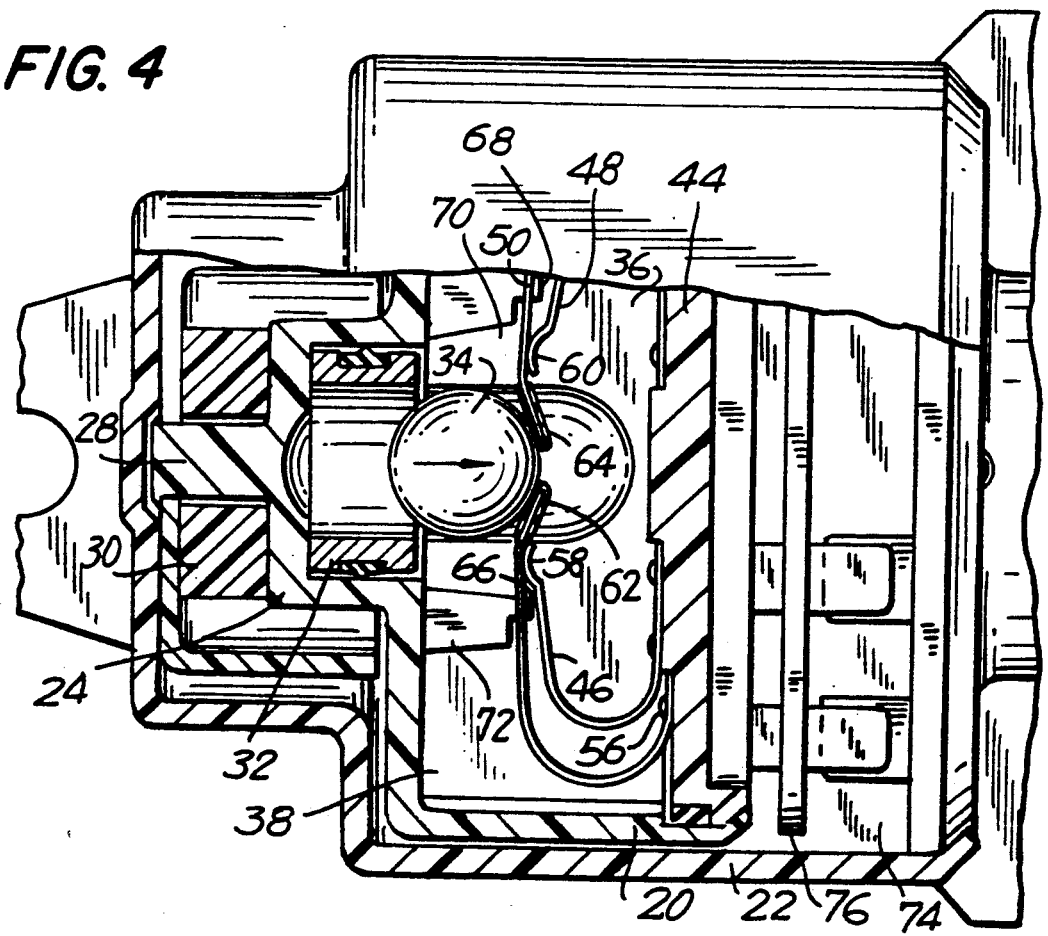
FIG. 4 shows a side cross-sectional view of the accelerometer of FIG. 2 with the electrical contact blades in the closed position.

The sensor 10 operates in the following manner. Permanent magnet 30 generates a magnetic field, and sleeve 32 and ball 34 are made of a magnetically permeable material. The sleeve is arranged and constructed to bias ball against wall 26 as shown in FIG. 2. The sensor is positioned within a motor vehicle (for example, in the engine or the passenger compartment) in such an orientation that, if the vehicle experiences a deceleration, ball 34 is urged in the direction indicated by arrow A in FIG. 2. If this deceleration is greater than a preselected threshold level (defined, for example, by the dimensions of the sensor and the strength of the field generated by the magnet) the force of deceleration overcomes the force of the magnetic field and the ball 34 is projected in direction A along the passageway 40. As the ball moves through the passageway, it comes into contact (relatively simultaneously) with the tips of the upper blades 50, 52. Since these tips are insulated, no electrical contact is made at this time. The ball keeps moving in the direction A bending blades 50, 52 in the same direction until these blades come into contact with the curved sections 58, 60, as shown in FIG. 4. This contact forms an electrical path between blades 48, 50 and another electrical path between blades 46 and 52. These completed electrical paths may be used to generate an electrical signal which may be sent, for example, on conductor 14, 16 to a passenger restraint apparatus 80 such an air bag assembly (not shown) for the deployment of the system. As shown in FIG. 4, after contact, both sets of blades are bent in direction A by the ball until the ball comes to a stop.

Obviously, numerous modifications may be made to the invention without departing from its scope as defined in the appended claims.

I claim:

1. An accelerometer for sensing velocity changes comprising:
    a housing with a first end and a second end;
    a sensing element movably disposed in said housing; and
    biasing means for applying a biasing force on said sensing element;
    first and second contact blades said first contact blade being provided with a an insulating coating to prevent an electrical path through said sensing element, said sensing element being arranged and constructed to move said first contact blade from a first position toward a second position away from said first position in response to a deceleration force exceeding said biasing force to contact said second contact blade with said second contact blade being initially stationary as said first contact blade is being displaced.

2. The accelerometer of claim 1 wherein said biasing means comprises a permanent magnet.

3. A passenger restraint system for a motor vehicle comprising:
    a passenger restraint device disposed in a motor vehicle for protecting a passenger in a crash; and
    an accelerometer for sensing a velocity change of said motor vehicle coupled to said passenger restraint device and comprising:
    a cylindrical housing disposed in said motor vehicle;
    a first pair of contact blades axially disposed in said housing; and
    contact closing means arranged in said housing for making direct electrical contact between said contact blades when said motor vehicle decelerates at a level exceeding a threshold level by displacing one contact blade of said first pair toward the other contact blade while said other contact blade initially remains stationary until it is touched by said one contact blade, said one contact blade having an insulated coating for insulating said blades electrically from said contact closing means.

4. The passenger restraint system of claim 3 wherein said contact closing means comprises a contacting element movably disposed in said housing and magnetic biasing means for biasing said contacting element.

5. The passenger restraint system of claim 4 wherein said biasing means urges said contacting element toward a first position away from said contact blades.

6. The passenger restraint system of claim 5 wherein said housing is arranged in a housing position in which said contacting element is urged toward said contact blades when said motor vehicle is decelerated.

7. The passenger restraint system of claim 5 wherein said biasing means comprises a permanent magnet for applying a magnetic force on said contacting element.

8. The passenger restraint system of claim 7 wherein said biasing means further comprises a conductive sleeve disposed inside said housing for applying said magnetic force to said contacting element.

9. The passenger restraint system of claim 7 wherein said contacting element comprises a ball.

10. The passenger restraint system of claim 7 further comprising a second pair of blades spaced away from said first pair, said contacting element bending one blade of each pair toward the other blade to form two electrical paths.

* * * * *